United States Patent [19]

Dunmire

[11] Patent Number: 4,989,635
[45] Date of Patent: Feb. 5, 1991

[54] CHECK VALVE WITH REDUCED HOLD-OPEN PRESSURE

[75] Inventor: Charles W. Dunmire, Fresno, Calif.

[73] Assignee: CMB Industries, Inc., Fresno, Calif.

[21] Appl. No.: 435,870

[22] Filed: Nov. 13, 1989

[51] Int. Cl.⁵ ............................................. F16K 15/03
[52] U.S. Cl. ................................. 137/527; 137/512; 251/337
[58] Field of Search ............... 137/527, 527.2, 527.4, 137/512; 251/303, 337

[56] References Cited

U.S. PATENT DOCUMENTS

| | | | |
|---|---|---|---|
| 510,503 | 12/1883 | Falkinburg | 137/527 X |
| 825,499 | 7/1906 | Sturtevant | 137/527 X |
| 980,188 | 1/1911 | Blauvelt | 137/527 X |
| 1,399,791 | 12/1921 | Pierson | 251/337 X |
| 1,871,536 | 8/1932 | Le Bus | 137/527 X |
| 2,064,247 | 12/1936 | Evans | 137/527 X |
| 2,515,425 | 7/1950 | Restemeier | 137/527 X |
| 2,556,277 | 6/1951 | Hill et al. | 137/527 X |
| 2,827,921 | 3/1958 | Sherman et al. | 251/303 X |
| 3,026,902 | 3/1962 | Ruhl, Jr. | 137/527 X |
| 3,789,874 | 2/1974 | Hills | 137/527 |
| 3,990,471 | 11/1976 | Schutzer et al. | 137/527 |
| 4,067,356 | 1/1978 | Kreuz | 137/527 |
| 4,109,819 | 8/1978 | Kushman et al. | 137/527 X |
| 4,457,333 | 7/1984 | Sharp | 137/527 X |
| 4,552,174 | 11/1985 | Carl et al. | 251/337 X |
| 4,595,032 | 6/1986 | Banks | 137/527 |

OTHER PUBLICATIONS

"Backflow Prevention Assemblies," a brochure of FEBCO pp. 1, 8-16 and 21. Date unknown.
"Installation Maintenance and Parts Manual for Backfow Prevention Assemblies," Ames Co., Inc. pp. 7-8 and 12. Date unknown.
"Model RP-1 Backflow Preventor," Clayton Automatic Valves, pp. 88-89. Date unknown.
"Installation/Operation/Maintenance" Manual, Clayton Automatic Valves, pp. 63-79. Date unknown.

Primary Examiner—John Rivell
Attorney, Agent, or Firm—Townsend and Townsend

[57] ABSTRACT

A check valve with a reduced hold-open pressure includes a biasing device, such as a spring, directly connected to a pivoting clapper at one end and to the valve body at the other end. No intervening pivoting links are used between the spring and the clapper. Preferably, the clapper is connected only by being pivoted to the valve body and by the spring connecting it to the valve body.

10 Claims, 4 Drawing Sheets

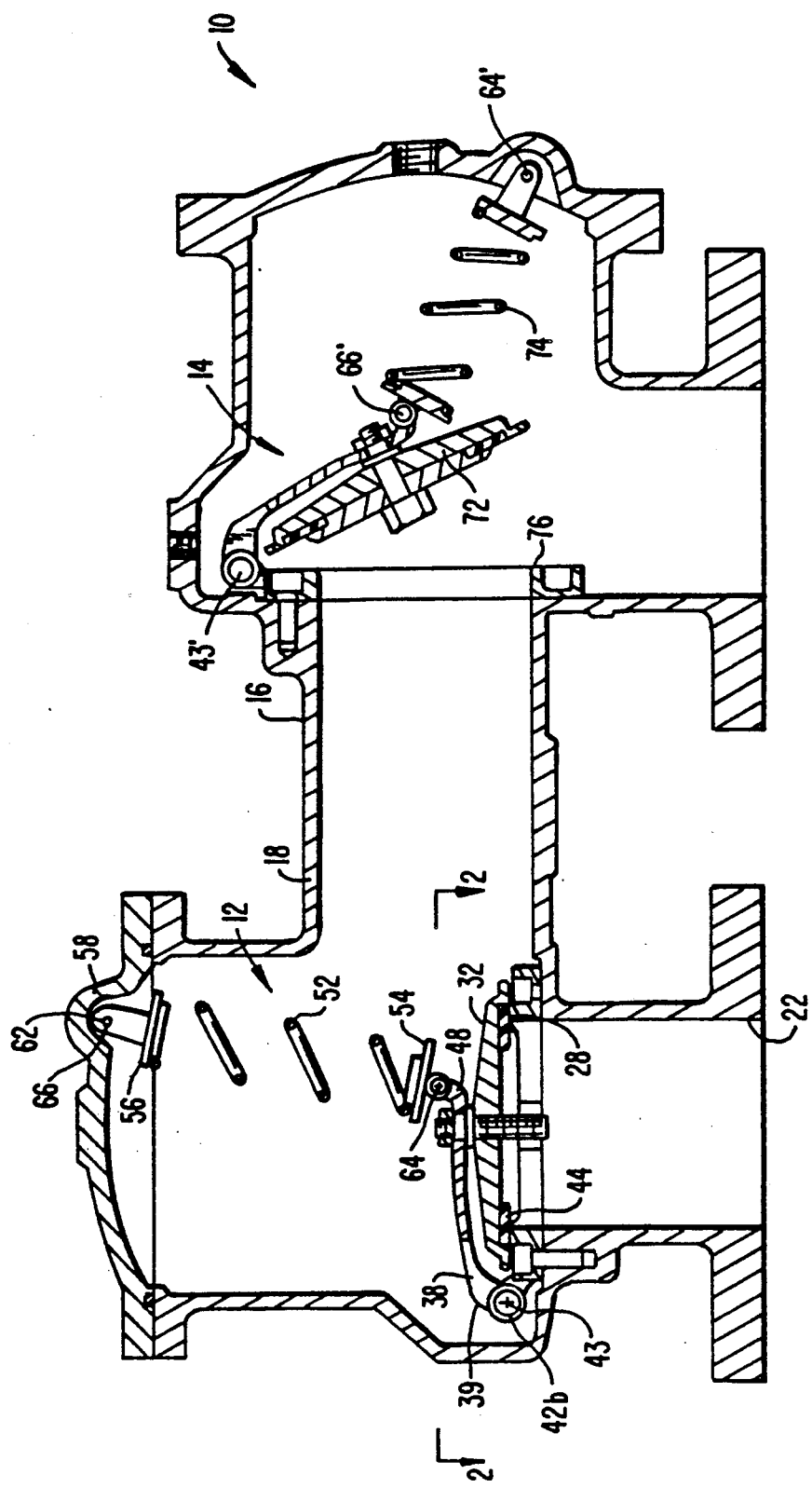
FIG._1.

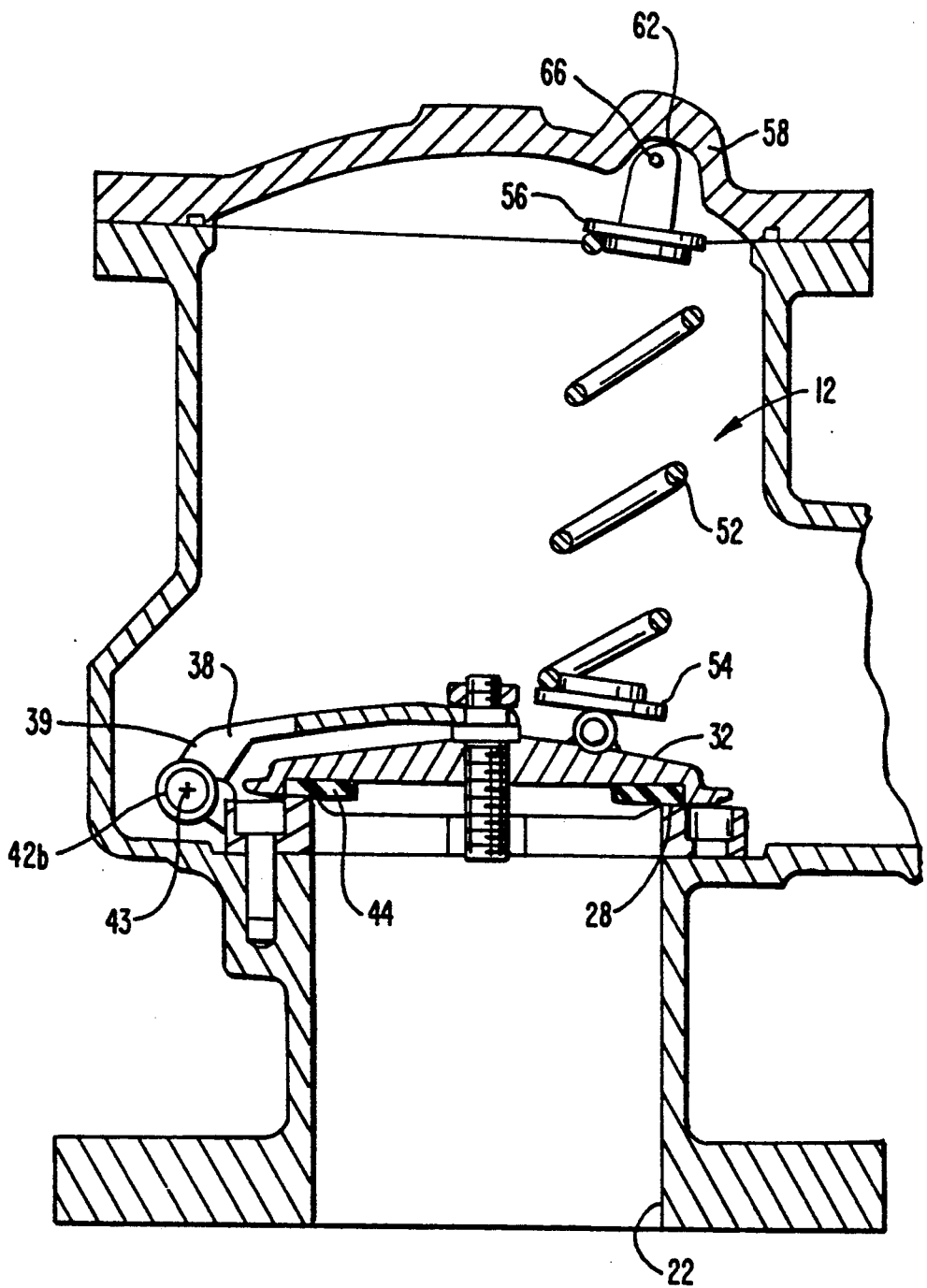
FIG._1A.

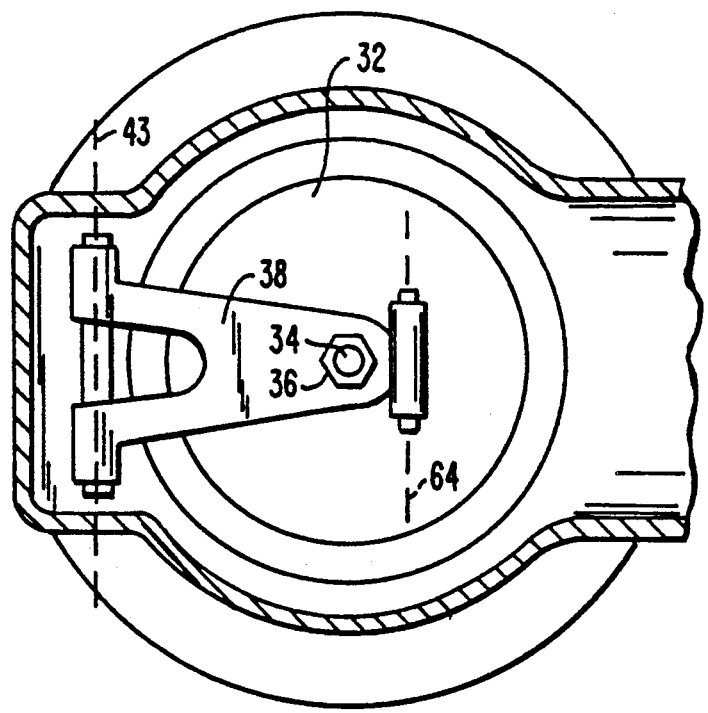
FIG._2.
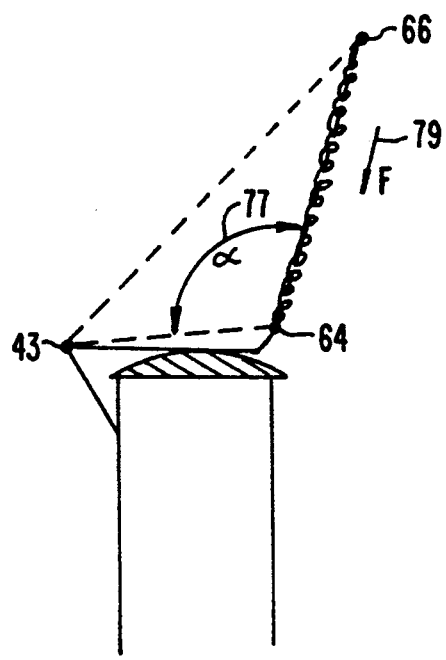
FIG._3A.
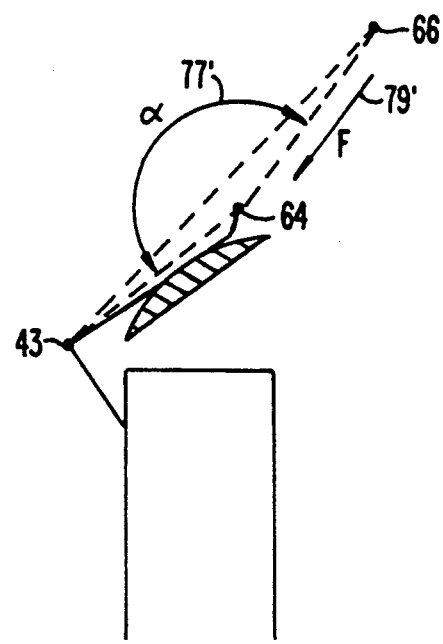
FIG._3B.

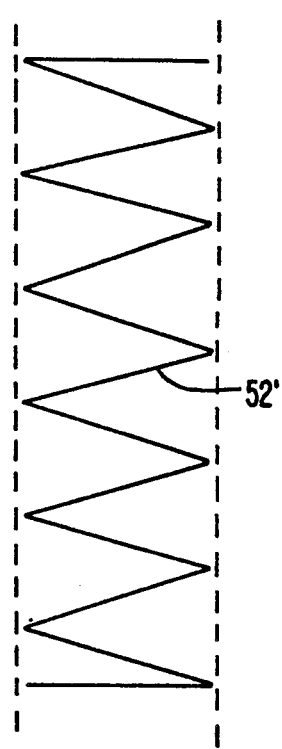
FIG._4A.
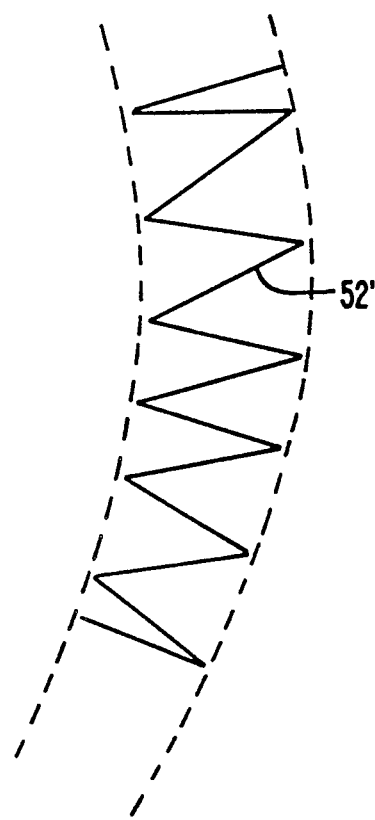
FIG._4B.
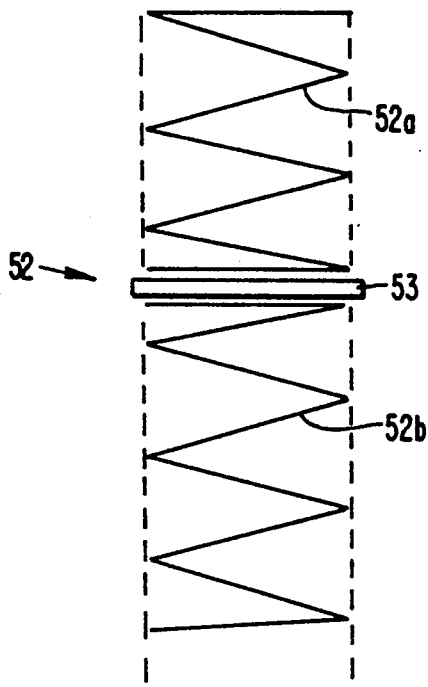
FIG._5A.
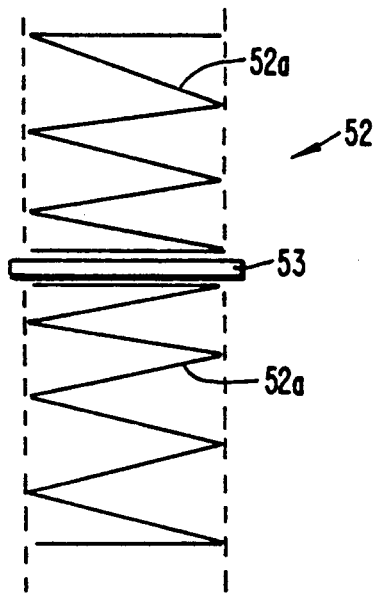
FIG._5B.

CHECK VALVE WITH REDUCED HOLD-OPEN PRESSURE

FIELD OF THE INVENTION

The present invention relates to a check valve and, in particular, to a check valve in which the hold-open force is less than the force holding the valve in a closed configuration.

BACKGROUND OF THE INVENTION

Check valves are well known for use in assuring that a flow through a conduit occurs only in a predefined direction. Check valves are used, for example, in backflow prevention assemblies to prevent backflow of one fluid body into another. Backflow prevention is often used in connection with protecting potable water supplies from contaminants which could otherwise be introduced into it via back-siphonage or back-pressure.

Typically, a check valve is designed to maintain its open configuration as long as there is flow through the valve. Once the flow stops or drops below a predetermined value, the check valve closes. Typically, check valves are designed so that, once the valve is closed, the inlet pressure must exceed a predetermined threshold before the valve will open. Usually, a single structure, typically a spring, is used both to provide the force to hold the valve closed (until the threshold is reached), and to provide the biasing force which moves the valve from the opened to the closed position. Because the biasing device provides some force tending to close the valve, even during normal flow conditions, a countervailing force must be provided to counteract the closing force and maintain the valve open, during normal flow conditions. Typically, the countervailing force is provided by the fluid moving through the valve. Accordingly, as the pressurized fluid moves through the valve, some amount of work is expended in holding the valve in the open position in opposition to the biasing force tending to close the valve. This expenditure of work causes a pressure drop across the check valve, so that the check valve itself necessarily creates a certain amount of loss of the pressure head. The amount of pressure minimally required at the inlet in order to maintain the valve in the open position is termed the "hold-open pressure." It is desirable to minimize the pressure drop or head loss during transit through the check valve, and, thus, it is desirable to reduce the hold-open force. Particularly, it is desirable that the hold-open force should be less than that from the threshold pressure. Accordingly, a number of previous check valves having a biasing device have been produced, which create a greater force on the valve when it is in the closed position than when in the open position.

Many previous designs for reduced hold-open pressure check valves involve providing a linkage of one or more rigid pivoting arms connecting the clapper to the wall or body of the valve. U.S. Pat. No. 980,188, issued Jan. 3, 1911, to Blauvelt, for example, discloses a flap or swing-type valve having a clapper which can pivot toward or away from a valve seat. The clapper is pivotally connected to a rigid link or arm which, in turn, is pivotally connected to a spring.

Other valving devices include a knuckle or toggle-type linkage having two or more relatively pivoting arms or links.

SUMMARY OF THE INVENTION

Valves containing a relatively large number of moving parts, such as pivoting rigid arms, are typically susceptible to wear or deterioration, particularly in corrosive, contaminated, or depositional environments, such as in hard water. Furthermore, rigid linkage systems are relatively expensive to design, produce, install, and maintain. Installation and maintenance often require use of special tools.

The present invention includes a spring which connects the valve clapper to the valve body. Preferably the spring connects the clapper to a removable cover portion of the valve body. The spring can be viewed as taking the place of one or more of the rigid links of previous devices. Preferably, the spring is directly connected to the clapper device, i.e., without an intervening linkage, and forms the sole connection between the clapper device and the valve wall (preferably the cover portion of the valve wall). The spring pivots with respect to the clapper about a pivot point, with the pivot point remaining in a fixed position with respect to both the end of the spring and the clapper device during opening and closing of the valve. The spring provides a force along its longitudinal axis without a lateral component.

BRIEF DESCRIPTION OF THE DRAWINGS

FIG. 1 is a cross-sectional view through a check valving device showing a closed check valve and an opened check valve;

FIG. 1A is a partial cross-sectional view corresponding to FIG. 1 but showing another embodiment of the present invention;

FIG. 2 is a cross-sectional view taken along line 2—2 of FIG. 1; and

FIGS. 3A and 3B depict, schematically, the triangles formed by the pivoting or attachment axes or points in the closed and opened configurations, respectively;

FIGS. 4A and 4B depict, schematically, an unstressed helical spring and a compressed and bowed helical spring; and FIGS. 5A and 5B depict, schematically, two end-joined helical springs, according to the preferred embodiment of the present invention in unstressed and stressed configurations, respectively.

DETAILED DESCRIPTION OF THE PREFERRED EMBODIMENT

As depicted in FIG. 1, a check valving device 10 is provided having a first check valve 12 and a second check valve 14. Although FIG. 1 depicts the first check valve 12 in a closed position, and the second check valve 14 in an open position, in actual operation, as described more fully below, the first and second valves 12, 14 will open and close substantially simultaneously or within a short time interval of one another. The valving device includes a valve body 16 made up of a wall 18. The valve body 16 can be formed of a number of materials, including ductile iron, brass, stainless, steel, or other metals, plastic, resin, glass, and/or ceramic and the like. The valve body 16 defines an inlet port 22 and an outlet port 24, preferably having a substantially circular cross-section. Preferably, the inlet port and outlet port include devices, such as flanges 26, for connecting the valving device 10 to fluid conduits. Adjacent to the inlet port 22 is a valve seat 28, such as an annular seat formed, for example, of iron.

A disk-shaped clapper 32 is rigidly connected, such as by using a bolt 34 and nut 36, to a clapper arm 38. A first end 39 of the arm 38 is pivotally mounted adjacent the valve seat 28 by connection to a portion of the valve body 16 by a pivot joint 42a, 42b to permit pivoting of the arm 38, and rigidly attached to disk 32 about a first axis 43.

The lower surface of the clapper 32 includes a seat disk 44 configured to sealingly mate with the valve seat 28 when the clapper 32 is pivoted to its closed position, as depicted in the left portion of FIG. 1. The disk 44 can be made of a number of materials, including plastic, rubber, resin, and the like, and is preferably a soft (such as about 40 durometer) elastomer material, such as a synthetic rubber e.g., EPDM (ethylene-propylene terpolymer). The disk 44 is reversible so that after it experiences wear, it can be removed, rotated 180° about a horizontal plane, and reinstalled.

The second end 48 of the clapper arm 38 is pivotally connected to a spring 52. The spring 52 is contained between first and second spring seats 54, 56. The spring 52 is preferably a helical spring which is compressional, i.e., is reduced in length as the valve 12 opens. The spring 52 can be formed of a number of materials, such as spring steel, plastic, or rubber. A single helical spring 52', such as that depicted in FIG. 4A, is commonly subject to deformation when compressed. As shown in FIG. 4B, a compressed helical spring commonly assumes a bowed or arcuate configuration. Although such a spring can be used in accordance with the present invention, according to the preferred embodiment, two springs 52A, 52B are joined end-to-end by connection to a plate-like or annular device, such as a washer 53, as depicted in FIG. 5A. Upon compression, as depicted in FIG. 5B, such a spring 52 tends to maintain its linear configuration and is not subject to bowing or distortion to the degree an ordinary helical spring 52B is.

The first spring seat 54 is pivotally attached to the second end 48 of the clapper arm 38 to permit pivoting of the spring 52 about a second axis 64.

The second spring seat 56 is pivotally connected to the valve body wall 18. In the preferred embodiment, the portion of the valve wall which the second spring seat 56 connects to is a removable cover 65 which can be attached to the remainder of the valve body wall 18, by e.g., bolts, screws, clamps, or the like (not shown). As shown in FIG. 1, the second spring seat 56 can be connected within a pocket 58 at an attachment point 62, to permit pivotal movement of the spring 52 about a third axis 66.

In the embodiment depicted in FIG. 1, the second valve 14 is positioned downstream from the first valve 12. Preferably, the second valve 14 is identical in construction to the first valve 12, and includes a clapper 72, a biasing device, such as a spring 74, and a valve seat 76. It will be understood, however, that the present invention can be used in single check valve configurations or other types of valve configurations.

Viewed in cross-section, each of the two valves 12, 14 define a triangle having vertices at the first axis 43, 43', second axis 64, 64', and third axis 66, 66', respectfully. When the valve 12 is closed, the spring biasing device 52 provides a force to the clapper 32, tending to hold the clapper 32 in the closed position. The amount of force is dependent upon two factors: (1) the magnitude of the longitudinal force provided by the spring 52; and (2) the component of that force which acts in a direction tending to close the clapper 32. As depicted in FIGS. 3A and 3B, the spring closing force can be described as $$\text{Sin}(180°-a) \cdot F \tag{1}$$

where $\alpha$ 77, 77' is the angle formed between the lines containing the first and second axes 43, 64, and the line containing the second and third axes 64, 66, and F 79, 79' is the vector force provided by the spring along the longitudinal spring axis which intersects the second axis 64 and third axis 66.

When the inlet pressure exceeds the outlet pressure, an opening force is created. When the opening force on the clapper 32 exceeds the spring closing force (shown in equation (1)) plus any closing forces provided by other sources, such as fluid pressure the clapper 32 moves away from the valve seat 28, opening the valve 12 to provide fluid communication between the inlet port and the outlet port 24. During the opening movement of the valve 12, the position of the second axis 64 changes with respect to the valve body 10, but does not change with respect to the clapper 32 or with respect to the adjacent end of the spring 52.

As the clapper 32 pivots about the first axis 43, the angle $\alpha$ increases from a value of about 118° 77 in the configuration shown on the lefthand portion of FIG. 1 (depicted schematically in FIG. 3A) to a value of about 164° 77' when in the fully opened configuration of the valve 14, shown on the righthand portion of FIG. 1 (depicted schematically in FIG. 3B). The closing force provided to the clapper 32 thus changes from about 87% of the spring force F 79 to about 27% of the spring force F 79'. However, during this time, the spring force F also changes, since it is proportional to the length of the spring 52, becoming larger as the valve 12 opens. In order to produce a valve 12 having a reduced hold-open force, the extreme values of the angle $\alpha$ 77, 77', the distance between the first and third axes 43, 66, and first and second axes 43, 64 are selected so that equation (1) yields a smaller closing force in the opened position of the valve (FIG. 3B) than in the closed position of the valve (FIG. 3A).

The particular values for the hold-open force, maximum tolerable head loss, and the threshold opening pressure will depend upon the particular use or application of the valving device 10. In one embodiment of the present invention, valving device 10 opens when the inlet pressure exceeds the outlet pressure by about 2-5 psi (about 14-35 kPa), and closes when the outlet pressure equals or exceeds the inlet pressure. Preferably, this embodiment has a head loss of less than 2 psi in a static or no-flow (limiting) condition, and there is little increase in head loss as the flow increases, such as a head loss of about 3 psi (about 20 kPa), with an operational flow velocity of about 7.5 ft./sec. (about 2.3 meters/sec.), or a rated flow velocity, e.g., 18 ft./sec. (about 5.5 meters/sec.) In another embodiment, the static condition head loss is about 8 psi (about 56 kPa), and the head loss during flow conditions remains below about 10 psi (about 70 kPa).

Based on the above description, a number of advantages of the present invention are apparent. The valve of the present invention reduces or eliminates rigid pivoting links. By reducing or eliminating links, the valve is made easier to design, produce, install, and maintain, and, in the preferred embodiment, can be installed and maintained without the use of special tools. The valve provides sufficient closing force and hold-closed force, while having a hold-open force which is low enough to produce a small head loss.

A number of modifications and variations of the invention can be used. A single check valve can be used without being provided in conjunction with a second check valve. The valve can be used for purposes other than as a backflow preventer. The check valve of the present invention can be used in combination with other valves or fluid-control devices. The valve can be used with fluids other than liquids. The valve can be configured without using a clapper arm, such as by directly pivoting the spring to the clapper and/or directly pivoting the clapper adjacent the valve seat. Other shapes and geometries of the clapper, ports, valve seats, and other components can be used. Other types of biasing devices can be used, including springs other than helical springs, hydraulic biasing devices, and the like.

Although the description of the invention has included a description of a preferred embodiment and certain modifications and variations, other modifications and variations can also be used, within the scope of the invention, which are described by the following claims.

What is claimed is:

1. A check valve, comprising:
   a valve body having at least first and second ports, one of said ports being an inlet port and the other of said ports being an outlet port;
   a valve seat adjacent to said first port;
   a clapper configured to sealingly mate with said valve seat, said clapper pivotally attached to said valve seat to pivot about a first axis between a first position, wherein said clapper sealingly mates with said valve seat and at least a second position spaced from said valve seat;
   first means for biasing said clapper in a direction toward said first position, said means for biasing having a first end and a second end, and forming a compressible connection between said clapper in said first position and said valve body;
   second means, adjacent said first end, for attaching said means for biasing to said valve body at an attachment point; and
   third means, adjacent said second end, for pivotally attaching said means for biasing to said clapper to permit pivoting of said means for biasing with respect to said clapper about a second axis, wherein the position of said second axis, with respect to said clapper and with respect to said second end, remains fixed during movement of said clapper from said first position to second position.

2. A check valve, as claimed in claim 1, wherein said second means pivotally attaches said means for biasing to said valve body to permit pivoting of said means for biasing about a third axis.

3. A check valve, as claimed in claim 1, wherein said means for biasing is directly attached to said clapper, in the absence of an intervening toggling linkage which pivots with respect to said clapper.

4. A check valve, as claimed in claim 1, wherein said first means includes first and second helical spring sections joined end-to-end by connection to a plate.

5. A check valve, as claimed in claim 1, wherein said clapper is connected to said valve body only by said pivotal attachment about said first axis and by said means for biasing, without rigid links connecting said clapper to said valve body which pivot with respect to said clapper.

6. A check valve, comprising:
   a valve body having at least first and second ports, one of said ports being an inlet port and the other of said ports being an outlet port, defining a downstream flow direction for flow through said valve;
   a valve seat adjacent to said first port;
   a rigid clapper device configured to sealingly mate with said valve seat, said clapper device pivotally attached adjacent to said valve seat to pivot about a first axis between a first position, wherein said clapper device sealingly mates with said valve seat and at least a second position spaced from said valve seat wherein said first and second ports are in fluid communication;
   compressional spring means providing a force having a component which biases said clapper device in a direction toward said first position, said means for biasing providing said force along a first longitudinal spring axis definable with respect to a first spring end and a second spring end;
   means, adjacent said first end, for attaching said means for biasing to said valve body at a first attachment point; and
   means, adjacent said second end, for pivotally attaching said means for biasing to permit pivoting of said means for biasing with respect to said clapper device about a second axis, said spring force being directed along a line passing through said first attachment point and said second axis substantially without a lateral force component.

7. A check valve, as claimed in claim 6, wherein said clapper device includes a disk and an arm rigidly attached to said disk.

8. A check valve, comprising:
   a valve body having an inlet port and an outlet port;
   an annular valve seat adjacent to said inlet port;
   a disk-shaped clapper configured to sealingly mate with said annular valve seat;
   an arm rigidly attached to said clapper having a first end and a second end, said first end being pivotally attached adjacent to said inlet port to permit pivoting of said clapper about a first axis from a first position sealingly mating with said valve seat to a second position spaced from said valve seat to permit fluid flow through said inlet port; and
   a helical compression spring having first and second spring ends, said first spring end pivotally attached to said valve body to permit pivoting of said spring about a second axis, said second spring end directly pivotally attached to said second end of said arm, to permit pivoting of said spring with respect to a third axis said spring producing a force along a first longitudinal spring axis definable with respect to said first spring end and said second spring end, said force having a closing component which biases said clapper to move in a direction toward said first position, said force being direct along a line passing through said second axis and said third axis substantially without a lateral force component in any clapper position, said closing component being greater when said clapper is in said first position than when said clapper is in said second position.

9. A check valving device, as claimed in claim 8, further comprising:
   a second valve seat positioned in said valve body downstream from said first valve seat;

a second clapper attached to move from a first position sealingly mating with said valve seat to a second open position; and means for biasing said second clapper in a direction toward said first position.

10. A method for check valving flow through a conduit, comprising:

providing a valve body having an inlet port and an outlet port with a valve seat adjacent to said inlet port;

pivotally attaching a clapper device adjacent to said inlet port to pivot about a first axis between a first position sealingly mating with said valve seat and a second position spaced from said valve seat;

providing a spring having first and second ends;

pivotally attaching said first spring end to said valve body to pivot about a second axis; and pivotally attaching said second spring end directly to said clapper device in the absence of an intervening linkage which pivots with respect to said clapper.

* * * * *